United States Patent
Guarneri et al.

(10) Patent No.: US 10,380,433 B2
(45) Date of Patent: Aug. 13, 2019

(54) METHOD OF DETECTING AN OVERTAKING VEHICLE, RELATED PROCESSING SYSTEM, OVERTAKING VEHICLE DETECTION SYSTEM AND VEHICLE

(71) Applicant: STMicroelectronics S.r.l., Agrate Brianza (IT)

(72) Inventors: Nunziata Ivana Guarneri, Caltanissetta (IT); Arcangelo Ranieri Bruna, Giardini Naxos (IT); Giuseppe Spampinato, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 66 days.

(21) Appl. No.: 15/472,562

(22) Filed: Mar. 29, 2017

(65) Prior Publication Data

US 2018/0082133 A1 Mar. 22, 2018

(30) Foreign Application Priority Data

Sep. 20, 2016 (IT) .................. 102016000094414

(51) Int. Cl.
*G06K 9/00* (2006.01)
*G06T 7/60* (2017.01)
(Continued)

(52) U.S. Cl.
CPC ....... *G06K 9/00791* (2013.01); *B60W 30/095* (2013.01); *G06K 9/00798* (2013.01);
(Continued)

(58) Field of Classification Search
CPC ....... G06K 9/00791; G06T 7/70; G08G 1/166
See application file for complete search history.

(56) References Cited

U.S. PATENT DOCUMENTS

| 5,777,690 A | 7/1998 | Takeda et al. |
| 7,009,500 B2 * | 3/2006 | Rao ............. B60R 21/0134 340/435 |

(Continued)

FOREIGN PATENT DOCUMENTS

| EP | 1033694 A2 | 9/2000 |
| EP | 1361543 A2 | 11/2003 |

(Continued)

OTHER PUBLICATIONS

Wang, Camera Calibration by Vanishing Lines for 3-D Computer Vision, IEEE Transactions on Pattern Analysis and Machine Intelligence, vol. 13, No. 4, Apr. 1991.*

(Continued)

*Primary Examiner* — Jamie J Atala
*Assistant Examiner* — Michael Robert Cammarata
(74) *Attorney, Agent, or Firm* — Crowe & Dunlevy

(57) ABSTRACT

A sequence of images is processed to generate optical flow data including a list of motion vectors. The motion vectors are grouped based on orientation into a first set of moving away motion vectors and a second set of moving towards motion vectors. A vanishing point is determined as a function of the first set of motion vectors and a center position of the images is determined. Pan and tilt information is computed from the distance difference between the vanishing point and the center position. Approaching objects are identified from the second set as a function of position, length and orientation, thereby identifying overtaking vehicles. Distances to the approaching objects are determined from object position, camera focal length, and pan and tilt information. A warning signal is issued as a function of the distances.

28 Claims, 6 Drawing Sheets

(51) Int. Cl.
　　　*G06T 7/70*　　　(2017.01)
　　　*G06T 7/73*　　　(2017.01)
　　　*G08G 1/16*　　　(2006.01)
　　　*G06T 7/215*　　(2017.01)
　　　*G06T 7/246*　　(2017.01)
　　　*B60W 30/095*　(2012.01)

(52) U.S. Cl.
　　　CPC ..... *G06K 9/00805* (2013.01); *G06K 9/00825* (2013.01); *G06T 7/215* (2017.01); *G06T 7/246* (2017.01); *G06T 7/60* (2013.01); *G06T 7/70* (2017.01); *G06T 7/73* (2017.01); *G08G 1/166* (2013.01); *G08G 1/167* (2013.01); *G06T 2207/30244* (2013.01)

(56) References Cited

U.S. PATENT DOCUMENTS

| | | | | |
|---|---|---|---|---|
| 9,679,477 | B2* | 6/2017 | Cho | B60R 1/00 |
| 9,734,717 | B1* | 8/2017 | Surpi | G08G 1/166 |
| 10,178,313 | B2* | 1/2019 | Spampinato | G06T 5/003 |
| 2009/0322872 | A1 | 12/2009 | Muehlmann et al. | |
| 2010/0322476 | A1* | 12/2010 | Kanhere | G08G 1/0175 382/103 |
| 2011/0298988 | A1 | 12/2011 | Kawai | |
| 2013/0286205 | A1 | 10/2013 | Okada et al. | |
| 2015/0348388 | A1* | 12/2015 | Teller | G06K 9/00671 340/937 |
| 2017/0018186 | A1* | 1/2017 | Probert | G08G 1/163 |
| 2017/0287164 | A1* | 10/2017 | De Muynck | G06T 5/008 |

FOREIGN PATENT DOCUMENTS

| | | | | |
|---|---|---|---|---|
| EP | 2128821 | A1 | 12/2009 | |
| WO | WO-2017116570 | A1* | 7/2017 | G01C 21/26 |

OTHER PUBLICATIONS

Kong, H., Audibert, J.-Y. and Ponce, J., "Vanishing point detection for road detection", in CVPR, pp. 96-103, 2009.

IT Search Report and Written Opinion for IT Appl. No. 201600094414 dated May 26, 2017 (9 pages).

\* cited by examiner

METHOD OF DETECTING AN OVERTAKING VEHICLE, RELATED PROCESSING SYSTEM, OVERTAKING VEHICLE DETECTION SYSTEM AND VEHICLE

PRIORITY CLAIM

This application claims the priority benefit of Italian Application for Patent No. 102016000094414, filed on Sep. 20, 2016, the disclosure of which is hereby incorporated by reference in its entirety.

TECHNICAL FIELD

Embodiments of the present disclosure relate to techniques for detecting an overtaking vehicle.

BACKGROUND

In the last decade, automotive companies have considerably invested in innovation concerning many aspects of Automatic Driver Assistance Systems (ADAS). Due to the increasing attention toward automotive smart systems, a significant effort has been expended in terms of new hardware and software equipment.

For example, modern cars may use back, forward and/or side cameras for different purposes. Some of the most popular applications are: Cross Traffic Alert (CTA), Lane Departure Warning (LDW), Collision Avoidance (CA) and Blind Spot Detection (BSD). The different ADAS solutions may be advantageously used in different road scenarios. For example, CTA may be useful in city road environments where other vehicles can cross the road. Conversely, LDW or BSD may be useful on highways where the car reaches high speeds and a brief distraction of the driver can lead to an accident.

Usually, these systems use one or more sensors for monitoring the car environment. For example, camera based systems may be employed for the surveillance of the vehicle, automatic navigation, traffic sign recognition and/or pedestrians tracking. Radar based systems may be used to measurement the distance between vehicles to avoid collision and far infrared based systems may be able to detect living objects like animals and pedestrians. These sensors are often used in different numbers and combinations to realize various systems.

FIG. 1 shows a possible solution for an overtaking vehicle detection system to be used, for example, in a BSD system.

In the example considered, at least one camera 10 is placed in the vicinity of (for example, on) one or both side view/wing mirrors 20a and 20b of a vehicle 2, such as a car, truck or motorcycle. The camera 10 is arranged to monitor the back and/or lateral road situation with respect to the vehicle 2.

In this context, a common road scenario is the overtaking of the preceding car by the vehicle 2 and, in this case, a brief distraction or a loss of concentration can lead the driver to undertake this action, even if there is an already overtaking vehicle 4, leading to serious accidents.

The images provided by the camera(s) 10 are thus be used to automatically analyze respective areas 100a/100b of the road scenario and consequentially generate a warning signal adapted to warn the driver when another vehicle 4 is overtaking.

For example, as shown in FIG. 2, a typical detection system may comprise a camera (C) 10 generating an image IMG, a processing system (P) 30 and an alert device (A) 12, such as a visual, acoustic and/or haptic actuator. For example, by analyzing the images IMG, the processing system 30 may generate a warning signal WARN used to drive the actuator 12, for example, in order to activate a luminous indication shown via some kind of display means, such as one or more LEDs, being arranged, for example, in the vicinity of the respective mirror 20a/20b.

In view of the above, there is a need in the art to provide solutions for detecting an overtaking vehicle.

SUMMARY

According to one or more embodiments, one or more of the above objectives are achieved by means of a method of detecting an overtaking vehicle. Embodiments moreover concern a related processing system, overtaking vehicle detection system and vehicle.

As mentioned in the foregoing, various embodiments of the present disclosure relate to an overtaking vehicle detection system.

In various embodiments, the system receives a sequence of images from a camera adapted to be mounted on a host vehicle, wherein the camera has a given focal length.

In various embodiments, the system elaborates the sequence of images in order to generate optical flow data comprising a list of motion vectors being associated with respective features in the sequence of images.

In various embodiments, the system analyses the optical flow data in order to group the motion vectors based on their orientation, thereby determining a first set of optical flow data comprising the motion vectors relating to features departing (moving away) from the host vehicle, and a second set of optical flow data comprising the motion vectors relating to features approaching (moving towards) the host vehicle.

In various embodiments, the system computes a vanishing point as a function of the motion vectors in the first set of optical flow data.

In various embodiments, the system determines a center position of the images and computes pan and tilt information as a function of the distance of the vanishing point from the center position.

In various embodiments, the system determines one or more objects approaching the host vehicle by grouping the motion vectors in the second set of optical flow data as a function of their position and their length and/or orientation, thereby identifying overtaking vehicles. For example, in various embodiments, the one or more objects approaching the host vehicle are determined by clustering the motion vectors with similar positions and similar lengths and/or orientations.

In various embodiments, the system determines the distance of each of the objects approaching the host vehicle from the host vehicle. Specifically, in various embodiments, the system determines the distances as a function of the position of the respective object in the last image of the sequence of images, the focal length of the camera, and the pan and tilt information. In various embodiments, the system may take into account also the mounting height of the camera. For example, in various embodiments, the system determines first a distance for each object approaching the host vehicle as a function of the position of the respective object in the last image, the focal length and the height. Next, the system corrects this distance based on the pan and tilt information.

In various embodiments, the system determines a warning signal as a function of the distances. For example, in various embodiments, the distances are compared with one or more threshold values. More specifically, in various embodiments, the system determines the distances of each object approaching the host vehicle also for a previous frame and determines for each of the objects at least one respective threshold value as a function of the distance of the respective object and the distance of the respective object in the previous frame.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
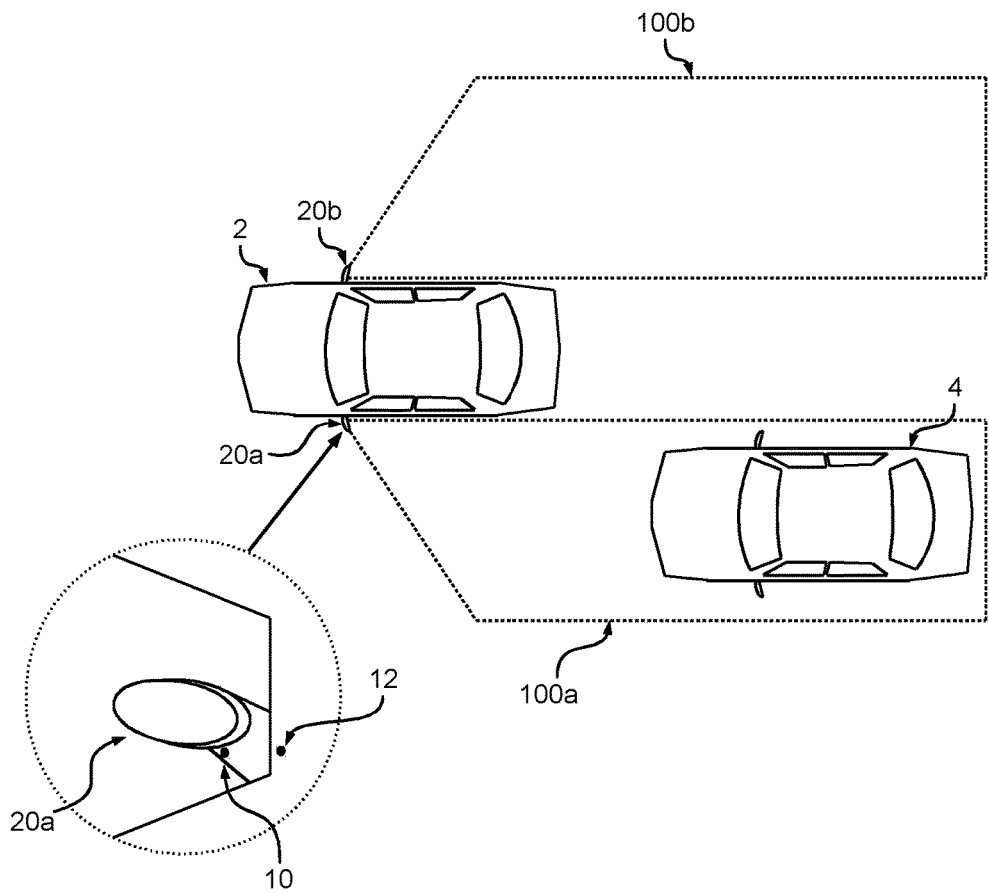
FIG. 1 shows a possible solution for an overtaking vehicle detection system to be used, for example, in a BSD system.
Figure 2:
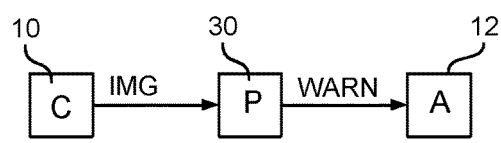
FIG. 2 shows a typical detection system.

In the following FIGS. 3 to 11 parts, elements or components which have already been described with reference to FIGS. 1 to 2 are denoted by the same references previously used in such Figures; the description of such previously described elements will not be repeated in the following in order not to overburden the present detailed description.

As mentioned in the foregoing, various embodiments of the present disclosure relate to solutions for detecting an overtaking vehicle 4 by means of one or more cameras (C) 10 fixed to a host vehicle 2. Accordingly, the solutions described herein may be used in the system shown in FIG. 1, for example, in a Blind Spot Detection (BSD) system, and the respective description will not be repeated again.

In various embodiments, a vehicle 4 in overtaking phase is detected by assessing its distance from the host vehicle 2 and, according to the estimated distance, to warn the driver.

In various embodiments, the images provided by the one or more cameras are elaborated to extract motion vectors, i.e. the system may determine an overtaking vehicle exclusively based on the motion vectors extracted from the scene.

Figure 3:
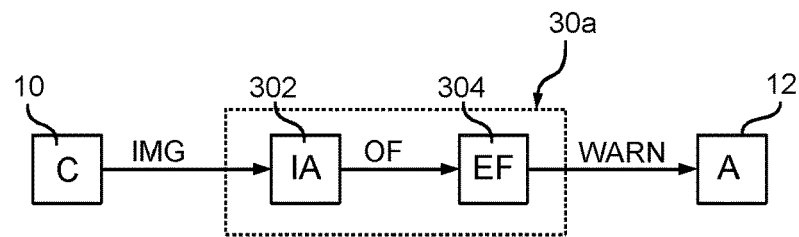
FIG. 3 shows an embodiment of a system for detection an overtaking vehicle in accordance with the present disclosure.

FIG. 3 shows an embodiment of a system configured to detect an overtaking vehicle 4.

As mentioned in the forgoing, such a system comprises at least one camera 10 suitable to be fixed to a vehicle 2 in such a manner that the camera 10 may monitor the back and/or lateral road situation of the vehicle 2. According, in use, the camera 10 will provide a sequence of images/frames IMG, i.e. a video stream, showing the back and/or lateral road situation of the vehicle 2. For example, in various embodiments, the camera 10 may be a STMicroelectronics VG6640 image sensor having 1.3 megapixel.

In the embodiment considered, the system comprises also a processing system 30a configured to receive the sequence of images IMG and elaborate the images IMG in order to detect overtaking vehicles.

In the embodiment considered, the processing system 30a is also configured to generate a warning signal WARN indicating that an overtaking vehicle 4 has been detected. For example, the signal WARN may be used to activate a visual and/or acoustic indicator (A) 12. Generally, the signal WARN may also be used to drive other actuators, such as haptic actuators, for example, in order to generate a vibration on the steering wheel or the driver's seat, etc.

As mentioned before, in various embodiments, the processing system 30a generates the signal WARN only based on the images IMG and no further sensors are used. However, in general, the solutions disclosed herein may also be combined with other data in order to improve the detection, such as data coming from ultrasound and/or radar distance sensors.

In various embodiments, the processing system 30a is implemented with an Image Signal Processor (ISP), such as an STMicroelectronics STV0991 processor. For example, this image processor has not only a classic pipeline for image reconstruct from a Bayer image, but includes already hardware image processing cores, for example, for embedded video analysis, including Optical Flow (OF) and edge data extraction. More specifically, this processor comprises an embedded ARM CPU, thereby permitting the execution of additional software code for implementing the complete processing system 30a within a single image signal processor.

Accordingly, the system 30a may work independently from the Engine Control Unit (ECU) of the vehicle 2. However, some results of the processing may also be fed from the processing system 30a to the ECU of the vehicle 2, such as the signal WARN. For this purpose, the processing system 30a may be connected to the ECU of the vehicle 2, for example, via a CAN (Controller Area Network) bus.

Generally, also a plurality of cameras 10 may be fixed to the same vehicle 2, thereby permitting a monitoring of different areas 100a/100b around the vehicle 1. For example, usually at least two cameras 10 are mounted on the lateral sides of the vehicle 2, for example, in the vicinity of the side view/wing mirrors. In this case, a single processing system 30a may be used, or a respective processing system 30a may be associated with each camera 10. For example, the latter being advantageously in order to implement an embedded system in the form of an integrated smart camera providing directly the signal WARN, i.e. the camera 10 and the processing system 30a may be integrated within a single package.

In various embodiments, the processing system 30a comprises two sub-modules.

The first module 302 is an image analyzer (IA) configured to analyze the images IMG provided by the camera 10 in order to generate optical flow data OF. For example, in various embodiments, the data OF include a collection/list of Motion Vectors (MV) indicating the motion of respective features in the current image/frame compared with the previous image/frame. As mentioned before, in various embodiments, the optical flow data OF are computed in hardware, thereby permitting a real time processing with, for example, 30 fps. Generally, the computation of optical flow data OF, in particular of motion vectors, is well known in the art, rendering a more detailed description herein unnecessary.

A second module 304 an elaboration function (EF) that receives the optical flow data OF from the module 302 and elaborates the data OF. For example, the module 302 may store the data OF in a memory, such as a dual-port RAM, and the module 304 may access the same memory locations in order to read the data OF. Specifically, the module 304 is configured to elaborate the optical flow data OF in order to determine the signal WARN.

In various embodiments, the module 304 is a software module, for example, executed by means of the processor, for example, the processor comprising also the (hardware) module 302.

Figure 4:
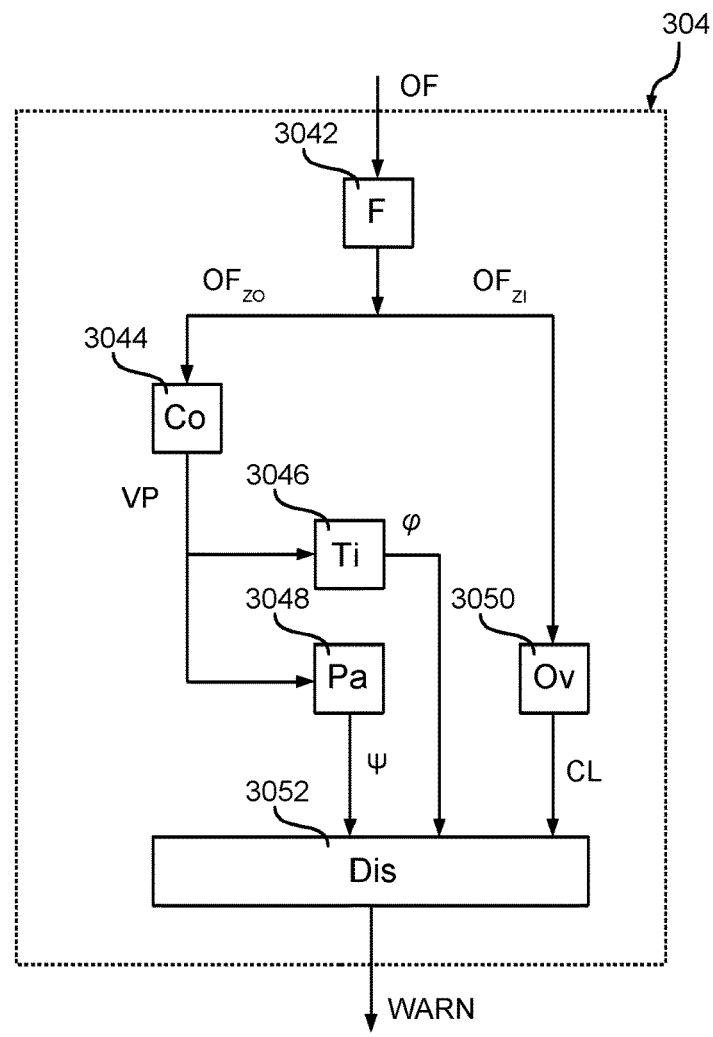
FIG. 4 shows an embodiment of a method of detecting an overtaking vehicle based on optical flow data.

FIG. 4 shows an embodiment of a method of detecting an overtaking vehicle implemented within the module 304.

In the embodiment considered, the module 304 receives the optical flow data OF, for example, the motion vectors MV, having been estimated by the module 302. For example, as mentioned in the foregoing, the module 304 may access given locations in a dual-port RAM.

Figure 5:
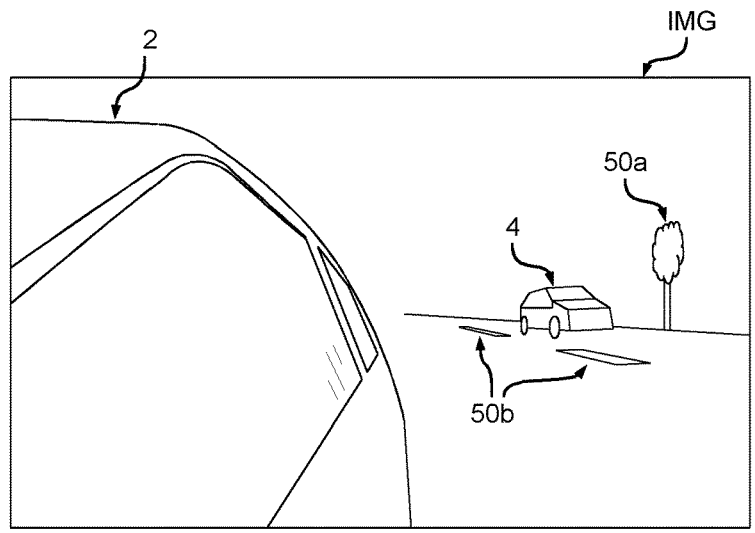
FIGS. 5, 6, 7, 8, 9, 10, 11a, 11b and 11c show details of the method of FIG. 4.

For example, FIG. 5 shows a possible IMG obtained from the camera 10. In the example considered, the image IMG contains a rather fixed part showing a side portion of the vehicle 2 and a dynamic part showing the environment surrounding the vehicle 2. Specifically, this environment may comprise road features such as objects 50a along the road, for example, trees, bushes, guard rails, traffic signs, etc., and/or lane markers 50b. In the exemplary image IMG is also shown an overtaking vehicle 4.

Figure 6:
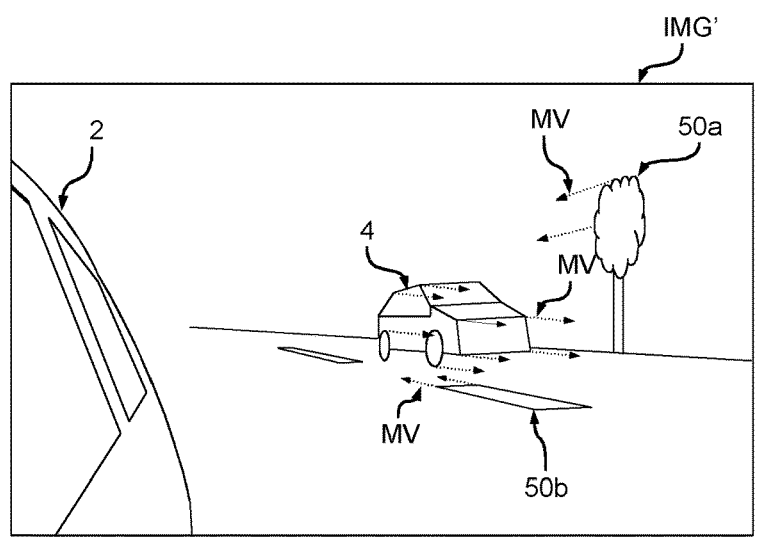

FIG. 6 shows in this context an enlarged view IMG' of the image IMG', which may be obtained, for example, by cropping part of the image IMG. Moreover, FIG. 6 shows some possible motion vectors MV determined by the module 302 by analyzing the sequence of images IMG or IMG'.

In various embodiments, the module 304 filters (F) at a step or block 3042 the optical flow data OF in order to determine two subsets of optical flow data OF:
the first set of optical flow data $OF_{ZO}$ relates to road features 50a/50b, i.e. features in the image IMG departing (moving away) from the host vehicle 2, and
the second set of optical flow data $OF_{ZI}$ relates to objects, such as overtaking vehicles 4, being faster than the vehicle 2, i.e. features in the image IMG approaching (moving towards) the host vehicle 2.

In various embodiments, the filtering is based on the orientation of the motion vectors MV.

Figure 7:
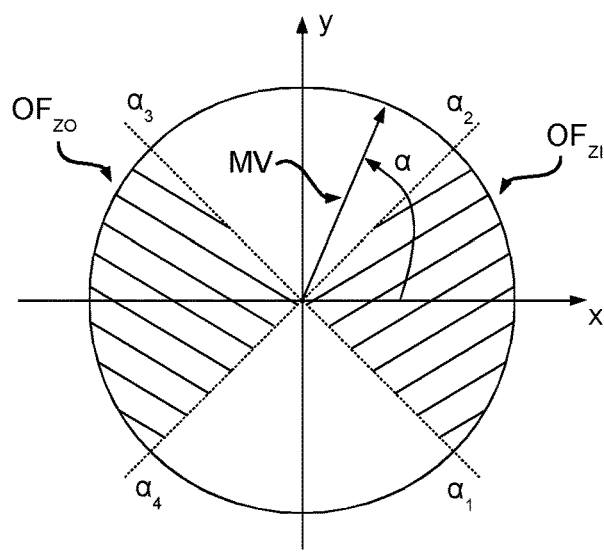

For example, FIG. 7 shows a first embodiment for selecting the above sets of optical flow data.

Specifically, in the embodiment considered, the optical flow data are grouped based on the angle α of the motion vectors MV, for example, with respect to the horizontal axis x (or alternative to the vertical axis y).

For example, in case the angle of the motion vector is between a first and a second angle $\alpha_1$ and $\alpha_2$, the respective motion vector $MV_{ZI}$ is assigned to the second set of optical flow data $OF_{ZI}$. Similarly, in case the angle of the motion vector is between a third and a fourth angle $\alpha_3$ and $\alpha_4$, the respective motion vector $MV_{ZO}$ is assigned to the first set of optical flow data $OF_{ZO}$.

In various embodiments, the other motion vectors MV are disregarded and not considered any more in the further processing.

For example, in various embodiments, when the angle of the motion vector is between $\alpha_1=-45°$ (i.e. +315°) and $\alpha_2=+45°$ the motion vector points away from the host vehicle 2 and the motion vector is assigned to the second set of optical flow data $OF_{ZI}$. Similarly, when the angle of the motion vector is between $\alpha_3=+135°$ and $\alpha_4=+225°$ the motion vector points towards the host vehicle 2 and the motion vector is assigned to the first set of optical flow data $OF_{ZO}$.

In various embodiments, the gradient and the direction of the motion vector (for example, with respect to the x direction) are used instead of the angle. For example, in this case, the motion vector may be assigned to the second set of optical flow data $OF_{ZI}$ when the gradient is between −1 and +1, and the motion vector points away from the host vehicle 2, i.e. has a positive value in the x direction. Similarly, the motion vector may be assigned to the first set of optical flow data $OF_{ZO}$ when the gradient is between −1 and +1, and the motion vector points towards the host vehicle 2, i.e. has a negative value in the x direction.

Generally, the module 304 may also take into account the starting point of the motion vector MV, i.e. the position of the respective feature in the image IMG/IMG', for example, in order to reduce further the range of the angle/gradient of the motion vector.

Figure 8:
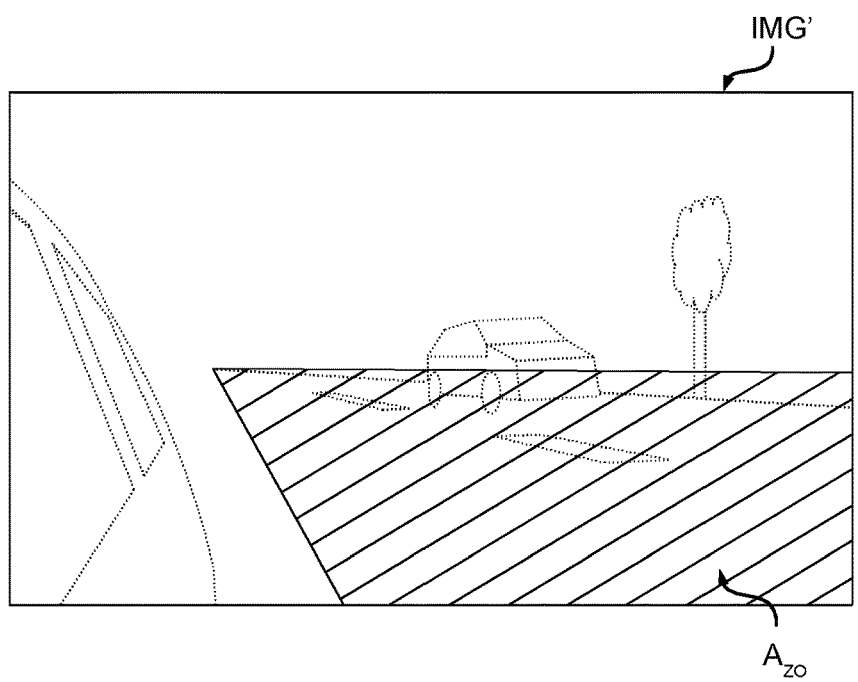

For example, FIG. 8 shows an embodiment, in which the module 304 restricts the selection of the first set of optical flow data $OF_{ZO}$ to the motion vectors being in a given area $A_{ZO}$ in the image IMG/IMG'. For example, in various embodiments, this area $A_{ZO}$ corresponds the part of the image IMG/IMG' where usually are visible the guardrail and the lane markers. In this case, also the range for the angle/gradient may be further reduced, for example, in order to select only those motion vectors MV relating to features in the area $A_{ZO}$ and having, for example, an angle between $\alpha_3=+135°$ and $\alpha_4=+190°$.

Similarly, the module 304 may restrict the selection of the second set of optical flow data $OF_{ZI}$ to the motion vectors being in a respective area in the image IMG/IMG' expected to comprise an overtaking vehicle.

Those of skill in the art will appreciate that the above behavior has to be mirrored when the camera is mounted on the other side of the vehicle 2. In fact, generally:
the first set of optical flow data $OF_{ZO}$ comprises the motion vectors $MV_{ZO}$ pointing in the direction of the host vehicle 2 and relating to road features 50a/50b, i.e. features in the image IMG departing (moving away) from the host vehicle 2 and
the second set of optical flow data $OF_{ZI}$ comprises the motion vectors $MV_{ZI}$ pointing away from the host vehicle 2 and relating to vehicles 4 being faster than the vehicle 2, i.e. a features in the image IMG approaching (moving towards) the host vehicle 2.

In various embodiments considered, the filtered optical flow data are used by a step or block 3044 in order to compute (Co) a vanishing point (VP) in the image IMG/IMG'.

Specifically, in various embodiments, the vanishing point VP is computed as a function of the motion vectors $MV_{ZO}$ belonging to the first set of optical flow data $OF_{ZO}$. For example, reference can be made to document Kong, H., Audibert, J.-Y. and Ponce, J., "Vanishing point detection for road detection", in CVPR, pp. 96-103, 2009, or German Patent Application Publication DE 102014209137 or U.S. Pat. No. 5,777,690, which are incorporated herein by reference for the purpose of calculating the vanishing point.

Figure 9:
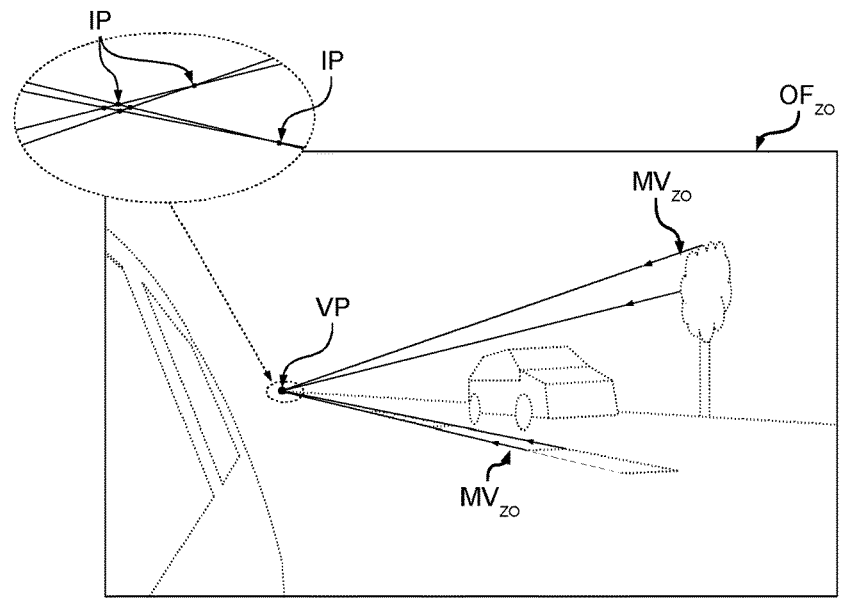

For example, FIG. 9 shows an embodiment, in which the module 3044 generates for each motion vector $MV_{ZO}$ belonging to the first set of optical flow data $OF_{ZO}$ a line along its direction.

In various embodiments, the module 3044 determines the intersection points IP amongst these lines and the module determines an average position of all intersections IP, for example, by computing the average x position and the average y position of the intersections IP in the current image IMG. In various embodiments, the module 304 uses this average position of all intersections IP as current vanishing point VP.

In various embodiments, the module 3044 may also perform a temporal averaging operation over plural subsequent images/frames, thereby permitting to reach a stable average vanishing point VP position. For example, the temporal averaging approach allows handling outlier OF, which can be wrongly included into the zoom-out set.

Generally, the computation of the (average) vanishing point may be performed once, for example, during a calibration phase when the camera 10 and processing system 30*a* are fixed to the vehicle 2 for the first time, periodically or even continuously.

In various embodiments, the (average) vanishing point is used by two steps or blocks (Ti) 3046 and (Pa) 3048 in order to compute tilt and pan information, respectively.

Figure 11A:
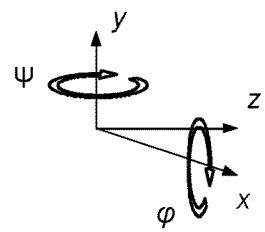

Generally, FIG. 11*a* shows a possible reference system for the camera 10.

Specifically, in the embodiment considered, the x and y directions correspond to the image plane of the image IMG and the z direction is the ground axis.

Accordingly, generally, the camera 10 may be rotated by an angle φ with respect to the x-axis (tilt) and by an angle ψ with respect to the y-axis (pan), i.e. a vertical movement of the optical axis with respect to the ground axis (z) determines a tilt angle φ, while a horizontal movement of the optical axis with respect to the ground axis (z) determines a pan angle ψ.

Figure 11B:
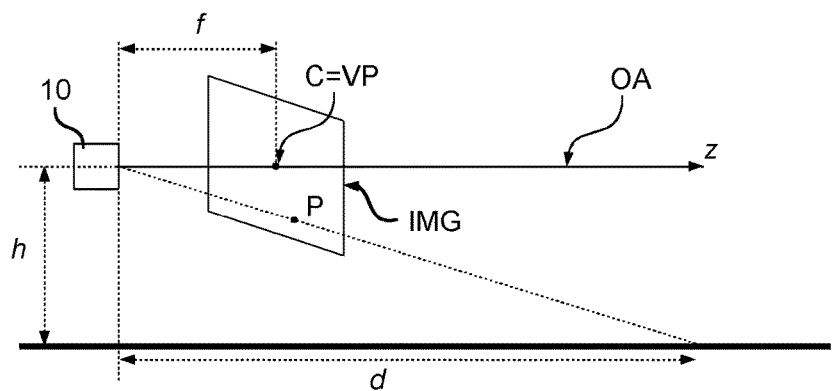

FIG. 11*b* shows a typical mounting of the camera 10, in which the optical axis OA of the camera 10 is aligned with the ground axis (z-axis), i.e. the tilt (φ) and pan (ψ) angles are equal to zero. For example, this is typically the case when the camera 10 is mounted on the front or back of a vehicle. In this case, the center C of the image IMG acquired by the camera 10 corresponds to the vanishing point VP and the distance d of an object from the camera 10 may be computed as a function of the projected point P in the image IMG, the focal distance f of the camera 10 and the mounting height h with respect to the ground. For example, the well-known pinhole camera model equations may be used to calculate the distance d.

Figure 11C:
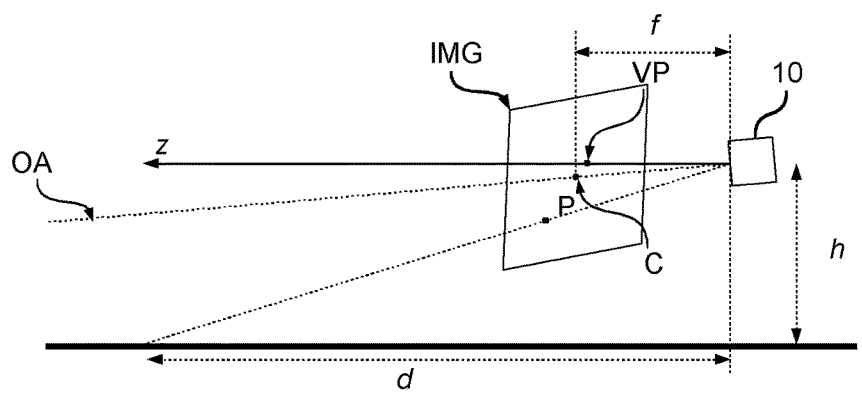

Conversely, FIG. 11*c* shows a generic mounting of the camera 10 with arbitrary tilt (φ) and pan (ψ) angles, which is usually the case when the camera 10 is mounted on the side mirror. In this case, the optical axis OA is not parallel to the ground axis (z-axis). In fact, by changing the camera position in terms of orientation (tilt and pan different to zero), the prospective view of the scene is altered and, in this scenario, to obtain a truthful distance measure of the distance d between an object and the camera 10, it is advantageous to know the calibration camera setting, i.e. the tilt and pan.

In various embodiments, the module 3046 computes the tilt value based on the assumption that that the vanishing point VP lies at a position where the z coordinate of (x, y, z) approaches infinity.

Conversely, in various embodiments, the module 3048 computes the pan value based on the pinhole camera model relation between pixel and camera coordinates. Specifically, once having computed a vanishing point VP with distances $VP_x$ and $VP_y$ from the center coordinate C in x and y direction, respectively, the tilt angle φ and the pan angle ψ may be computed as follows:

$$\varphi = \tan^{-1}\left(\frac{VP_y}{f}\right) \quad (1)$$

$$\psi = \tan^{-1}\left(\frac{VP_x \cdot \cos(\varphi)}{f}\right) \quad (2)$$

Accordingly, in the embodiment considered, the tilt information φ is computed based on the distance $VP_y$ in vertical (φ) direction of the vanishing point VP from the center position C and the focal length f of the camera 10. Similarly, the pan information w may be computed based on the distance $VP_x$ in horizontal (x) direction of the vanishing point VP from the center position C, the tilt information φ and the focal length f of the camera 10.

Generally, similar to the computation of the (average) vanishing point, also the computation of the tilt information φ and/or the pan information w may be performed once, for example, during a calibration phase when the camera 10 and processing system 30*a* are fixed to the vehicle 2 for the first time, periodically or even continuously.

In various embodiments, the computation is performed directly in the pixel domain, i.e. the values $VP_x$ and $VP_y$ are expressed as number of pixels. In this case, also the focal length f is expressed in pixels and to perform the conversion, for example, from millimeters, to pixels the following formula may be used:

$$f_{pixel} = \frac{f}{factorY} \quad (3)$$

where the conversion factor factorY corresponds to the ratio between sensor height (expressed, for example, in millimeters), and the height of the frame expressed in pixel.

Accordingly, in the embodiments considered, the step or block (Co) 3044 computes the vanishing point VP in the image IMG/IMG' as a function of the motion vectors $MV_{ZO}$ belonging to the first set of optical flow data $OF_{ZO}$. Moreover, in various embodiments, the steps or blocks (Ti) 3046 and (Pa) 3048 compute the tilt angle φ and the pan angle ψ, respectively, as a function of the vanishing point VP determined at the step of block 3044 and the focal distance f of the camera 10.

Conversely, in various embodiments, a step or block (Ov) 3050 is used to determine overtaking vehicles 4 in the image IMG/IMG' as a function of the motion vectors $MV_{ZI}$ belonging to the second set of optical flow data $OF_{ZI}$.

For example, in various embodiments, objects are identified by clustering the motion vectors $MV_{ZI}$. Generally, clustering refers to the task of grouping a set of information in such a way that information in the same group (called a cluster) are more similar to each other than to those in other groups. In the present application moving vehicles 4 approaching the host vehicle 2 should be identified. Accordingly, by clustering nearby motion vectors $MV_{ZI}$ belonging to the second set of optical flow data $OF_{ZI}$ having substantially similar characteristics, objects being faster than the host vehicle 2 may be identified.

For example, motion vectors $MV_{ZI}$ apparently belong to the same object if they:

a) are spatially near;
b) have a similar velocity, i.e. a similar length; and
c) have a similar orientation.

For example, in various embodiments, two motion vectors $MV_1$ and $MV_2$ at vector positions $P_1$ and $P_2$ and with vector velocities $V_1$ and $V_2$ are considered spatially near if:

$$SAD(P_1,P_2)<MPD \qquad (4)$$

where SAD indicates the Sum of Absolute Difference, and MPD represents a given threshold, for example, chosen depending on camera resolution and precision of optical flow data.

Similarly, in various embodiments, two motion vectors $MV_1$ and $MV_2$ are considered to have similar velocity if:

$$SAD(V_1,V_2)<MVD \qquad (5)$$

where MVD represents a given threshold chosen again as a function of the camera resolution and the precision of optical flow data.

Finally, in various embodiments, two motion vectors $MV_1$ and $MV_2$ are considered to have a similar orientation if $$ABS((\text{orientation}(V_1)-\text{orientation}(V_2))<\alpha; \qquad (6)$$

where ABS indicates the Absolute value operation and $\alpha$ represents a given threshold.

Generally, also other formulas can be used instead of the SAD, such as the Euclidean distance, etc.

In various embodiments, the step or block 3050 assigns the motion vectors $MV_{ZI}$ to different clusters CL based at least two of the above conditions a) to c). For example, in various embodiments, the step or block 3050 assigns the motion vectors $MV_{ZI}$ to different clusters CL based on conditions a) and b), and preferably also on condition c).

For example, in various embodiments, the step or block 3050 may use the clustering method described in document U.S. patent application Ser. No. 15/169,232 (Italian Application for Patent IT 102015000082886), which is incorporated herein by reference.

For example, in various embodiments, the step or block 3050 comprises or executes the following sub-steps: labeling, clustering and an optional merge clustering. Specifically, during the labeling step a label is assigned to each motion vector $MV_{ZI}$ as a function of its position, velocity and, optionally, orientation. Accordingly, motion vectors $MV_{ZI}$ with the same or substantially similar characteristics will have the same label and consequently motion vectors $MV_{ZI}$ with the same label may potentially belong to the same object/cluster. Next, the clustering sub-step groups motion vectors $MV_{ZI}$ with the same label into clusters.

At the end, the optional merge clustering step joins clusters with similar parameters, for example, similar positions, velocities (and orientations), by simple rectangle union operation. Cluster parameters may be obtained, for example, by taking the media of the respective parameters of the motion vector $MV_{ZI}$ inside the cluster.

Figure 10:
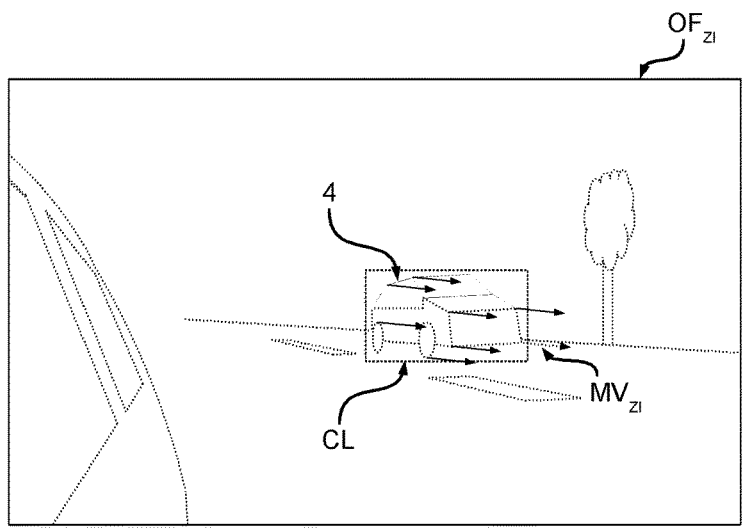

For example, FIG. 10 shows a possible result of the clustering operation performed by the block 3050, in which a single cluster CL corresponding to the vehicle 4 has been identified based on the motion vectors $MV_{ZI}$.

In various embodiments, the tilt and pan angles computed by the modules 3046 and 3048 and the clusters CL identifying overtaking vehicles determined by the module 3050 are used at a step or block 3052 in order to determine the signal WARN.

Specifically, in various embodiments, the module (Dis) 3052 computes the distances of the clusters CL detected by the module 3050. For example, in various embodiments, the pixel position of the down side of each cluster CL is considered as wheel position, on the image plane, of the overtaking vehicle. Accordingly, through geometrical properties it is possible to estimate the distance of the cluster CL/overtaking vehicle 4 from the host car 2 as a functions of the smallest vertical (y) position of the respective cluster CL, i.e. the down side of the respective cluster CL.

In various embodiments, again the pinhole camera model equations may be used to calculate the distance d of each cluster CL based on the above mentioned pixel positions in the current/last image IMG provided by the camera 10.

For example, taking as reference the setup showed in FIG. 11*b*, where the optical axis OA is aligned with the ground axis z, the formula used for detecting the distance d is:

$$d = \frac{f \cdot h}{P_y} \qquad (7)$$

where $P_y$ corresponds to the distance of the lower border of the respective cluster CL from the center coordinate C in the vertical (y) direction.

Generally, instead of using the exact mounting height h of the camera, also an approximated value may be used, for example, an average value for certain vehicle types.

Conversely, since the ideal condition shown in FIG. 11*b* usually does not apply in a real environment, a corrected distance value $d_{cor}$ may be calculated as a function of the distance computed by previous formula (7), the tilt and the pan angles computed by the modules 3046 and 3048.

$$d_\psi = \frac{d}{\cos \psi} \qquad (8)$$

$$d_{cor} = \frac{d_\psi}{\cos \varphi} \qquad (9)$$

In various embodiments, the assessed distance d or the corrected distance $d_{cor}$ is compared with a set of predetermined threshold values in order to evaluate the level of the risk. For example, in various embodiments, three distance thresholds expressed in meters are used:

1) threshold for high risk: $d<TH_1$ (for example, 5 m);
2) thresholds for medium risk $TH_1<d<TH_2$ (for example, 10 m); and
3) threshold for low risk: $d<TH_3$ (for example, 15 m);

Generally, these threshold values can be changed according to the expected sensibility of the system. Moreover, the thresholds may be determined also dynamically for each overtaking vehicle, for example, as a function of the velocity of the host vehicle 2 and/or the velocity of the overtaking vehicle 4.

For example, in various embodiments, the one or more thresholds are determined as a function of the difference between the velocity of the overtaking vehicle 4 and the velocity of the host vehicle 2.

For example, in various embodiments, the one or more thresholds are determined as a functions of the motion vectors MV associated with the respective cluster CL of the overtaking vehicle 4. More specifically, in various embodiments, at least one of the motion vectors MV associated with the respective cluster CL is used to compute in line with the foregoing the distance of the overtaking vehicle 4 from the host vehicle 2 both for the current frame and a previous frame. Next, the difference between theses distances, which in case of constant frame rate is indicative for the relative velocity of the overtaking vehicle 4 with respect to the host vehicle 2, may be used to determine the one or more threshold values.

Accordingly, after having compared the distance value d with the previous thresholds, the module 3052 assigns one of a plurality of risk levels to the signal WARN:

1) NO_RISK/LOW_RISK;
2) MEDIUM_RISK;
3) HIGH_RISK.

For example, in various embodiments, the different risk levels may be visualized by a luminous actuator showing different colors based on the signal WARN.

In various embodiments, the alert may be visualized through a video display wherein a different colored bounding box is shown around the overtaking vehicle: green in case of NO_RISK, yellow in case of MEDIUM_RISK and red in case of HIGH_RISK. In this embodiments, once the incoming vehicle is detected, the system follows its trajectory during the overtaking by changing the color of the bounding box in the order "green, yellow and red", till the car disappears from the scene.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A method of detecting an overtaking vehicle, comprising the steps of:
   receiving a sequence of images from a camera mounted on a host vehicle at a given height, said camera having a given focal length;
   processing said sequence of images in order to generate optical flow data comprising a list of motion vectors being associated with respective features in said sequence of images;
   analyzing said optical flow data in order to group said motion vectors based on their orientation, thereby determining:
   a) a first set of optical flow data comprising the motion vectors relating to features departing from the host vehicle; and
   b) a second set of optical flow data comprising the motion vectors relating to features approaching the host vehicle;
   computing a vanishing point as a function of the motion vectors in said first set of optical flow data;
   determining a center position of said images;
   computing pan and tilt information as a function of the distance of said vanishing point from said center position of said images;
   determining one or more objects approaching the host vehicle by grouping the motion vectors in said second set of optical flow data as a function of at least two of their position, their length and their orientation, thereby identifying overtaking vehicles;
   determining distances from the host vehicle of said one or more objects approaching the host vehicle as a function of:
   i) the position of the respective object in the last image of said sequence of images;
   ii) said given focal length; and
   iii) said given height;
   wherein determining distances uses the equation:

$$d = \frac{f \cdot h}{P_y}$$

where $P_y$ corresponds to the distance of a lower border of the respective cluster from the center position in a vertical direction, f is the focal length and h is the given height;
   correcting said determined distances from the host vehicle of said one or more objects approaching the host vehicle based on said pan and tilt information;
   wherein correcting said determined distances uses the equations:

$$d_\psi = \frac{d}{\cos\psi} \text{ and}$$

$$d_{cor} = \frac{d_\psi}{\cos\varphi}$$

where $\psi$ is the pan information and $\varphi$ is the tilt information;
   comparing the corrected determined distances $d_{cor}$ to a distance threshold; and
   determining a warning signal if the corrected determined distances are less than the distance threshold.

2. The method according to claim 1, wherein said pan ($\psi$) and tilt ($\varphi$) information are computed with the following equations:

$$\varphi = \tan^{-1}\left(\frac{VP_y}{f}\right)$$

$$\psi = \tan^{-1}\left(\frac{VP_x \cdot \cos(\varphi)}{f}\right)$$

where $VP_y$ and $VP_x$ correspond to the distance of said vanishing point with respect to said center position in a vertical and horizontal direction, respectively.

3. The method according to claim 1, wherein determining one or more objects approaching the host vehicle comprises clustering the motion vectors in said second set of optical flow data with similar positions and at least one of similar lengths and similar orientations.

4. The method according to claim 1, comprising:
   determining the distances of said one or more objects approaching the host vehicle in a previous frame; and
   setting said distance threshold as a function of a difference between said distance of the respective object approaching the host vehicle and said distance of the respective object approaching the host vehicle in a previous frame.

5. The method according to claim 1, comprising:
dynamically setting the distance threshold for each of said one or more objects approaching the host vehicle based on a velocity of the host vehicle.

6. The method according to claim 1, comprising:
dynamically setting the distance threshold for each of said one or more objects approaching the host vehicle based on a velocity of a corresponding one of the one or more objects.

7. The method according to claim 1, comprising:
dynamically setting the distance threshold for each of said one or more objects approaching the host vehicle based on a difference in velocity between the host vehicle and a corresponding one of the one or more objects.

8. A processing system, comprising:
an input configured to receive a sequence of images from a camera mounted on a host vehicle at a given height, said camera having a given focal length;
a data processor configured to:
  process said sequence of images in order to generate optical flow data comprising a list of motion vectors being associated with respective features in said sequence of images;
  analyze said optical flow data in order to group said motion vectors based on their orientation, thereby determining:
    a) a first set of optical flow data comprising the motion vectors relating to features departing from the host vehicle; and
    b) a second set of optical flow data comprising the motion vectors relating to features approaching the host vehicle;
  compute a vanishing point as a function of the motion vectors in said first set of optical flow data;
  determine a center position of said images;
  compute pan and tilt information as a function of the distance of said vanishing point from said center position of said images;
  determine one or more objects approaching the host vehicle by grouping the motion vectors in said second set of optical flow data as a function of at least two of their position, their length and their orientation, thereby identifying overtaking vehicles;
  determine distances from the host vehicle of said one or more objects approaching the host vehicle as a function of:
    i) the position of the respective object in the last image of said sequence of images;
    ii) said given focal length; and
    iii) said given height;
  wherein said distances are determined using the equation:

$$d = \frac{f \cdot h}{P_y}$$

where $P_y$ corresponds to the distance of a lower border of the respective cluster from the center position in a vertical direction, f is the focal length and h is the given height;
  correct said determined distances from the host vehicle of said one or more objects approaching the host vehicle based on said pan and tilt information;
  wherein said determined distances are corrected using the equations:

$$d_\psi = \frac{d}{\cos\psi} \text{ and}$$

$$d_{cor} = \frac{d_\psi}{\cos\varphi}$$

where $\psi$ is the pan information and $\varphi$ is the tilt information;
  compare the corrected determined distances $d_{cor}$ to a distance threshold; and
  determine a warning signal if the corrected determined distances are less than the distance threshold; and
an output configured to issue the warning signal.

9. The system according to claim 8, wherein said pan ($\psi$) and tilt ($\varphi$) information are computed with the following equations:

$$\varphi = \tan^{-1}\left(\frac{VP_y}{f}\right)$$

$$\psi = \tan^{-1}\left(\frac{VP_x \cdot \cos(\varphi)}{f}\right)$$

where $VP_y$ and $VP_x$ correspond to the distance of said vanishing point with respect to said center position in a vertical and horizontal direction, respectively.

10. The system according to claim 8, wherein determining one or more objects approaching the host vehicle comprises clustering the motion vectors in said second set of optical flow data with similar positions and at least one of similar lengths and similar orientations.

11. The system according to claim 8, comprising:
determining the distances of said one or more objects approaching the host vehicle in a previous frame; and
setting said distance threshold as a function of a difference between said distance of the respective object approaching the host vehicle and said distance of the respective object approaching the host vehicle in a previous frame.

12. The system according to claim 8, comprising:
dynamically setting the distance threshold for each of said one or more objects approaching the host vehicle based on a velocity of the host vehicle.

13. The system according to claim 8, comprising:
dynamically setting the distance threshold for each of said one or more objects approaching the host vehicle based on a velocity of a corresponding one of the one or more objects.

14. The system according to claim 8, comprising:
dynamically setting the distance threshold for each of said one or more objects approaching the host vehicle based on a difference in velocity between the host vehicle and a corresponding one of the one or more objects.

15. An overtaking vehicle detection system, comprising:
a camera mounted on a host vehicle at a given height and configured to generate a sequence of images, said camera having a given focal length; and
a processing system comprising:
  a data processor configured to:
    process said sequence of images in order to generate optical flow data comprising a list of motion vectors being associated with respective features in said sequence of images;

analyze said optical flow data in order to group said motion vectors based on their orientation, thereby determining:
  a) a first set of optical flow data comprising the motion vectors relating to features departing from the host vehicle; and
  b) a second set of optical flow data comprising the motion vectors relating to features approaching the host vehicle;
compute a vanishing point as a function of the motion vectors in said first set of optical flow data;
determine a center position of said images;
compute pan and tilt information as a function of the distance of said vanishing point from said center position of said images;
determine one or more objects approaching the host vehicle by grouping the motion vectors in said second set of optical flow data as a function of at least two of their position, their length and their orientation, thereby identifying overtaking vehicles;
determine distances from the host vehicle of said one or more objects approaching the host vehicle as a function of:
  i) the position of the respective object in the last image of said sequence of images;
  ii) said given focal length; and
  iii) said given height;
wherein said distances are determined using the equation:

$$d = \frac{f \cdot h}{P_y}$$

where $P_y$ corresponds to the distance of a lower border of the respective cluster from the center position in a vertical direction, f is the focal length and h is the given height;
correct said determined distances from the host vehicle of said one or more objects approaching the host vehicle based on said pan and tilt information;
wherein said determined distances are corrected using the equations:

$$d_\psi = \frac{d}{\cos\psi} \text{ and}$$

$$d_{cor} = \frac{d_\psi}{\cos\varphi}$$

where $\psi$ is the pan information and $\varphi$ is the tilt information;
compare the corrected determined distances $d_{cor}$ to a distance threshold; and
determine a warning signal if the corrected determined distances are less than the distance threshold; and
an output configured to issue the warning signal; and
an alert system configured to issue an alert to a driver of the host vehicle in response to the warning signal.

16. The system according to claim 15, wherein said pan ($\psi$) and tilt ($\varphi$) information are computed with the following equations:

$$\varphi = \tan^{-1}\left(\frac{VP_y}{f}\right)$$

$$\psi = \tan^{-1}\left(\frac{VP_x \cdot \cos(\varphi)}{f}\right)$$

where $VP_y$ and $VP_x$ correspond to the distance of said vanishing point with respect to said center position in a vertical and horizontal direction, respectively.

17. The system according to claim 15, wherein determining one or more objects approaching the host vehicle comprises clustering the motion vectors in said second set of optical flow data with similar positions and at least one of similar lengths and similar orientations.

18. The system according to claim 15, comprising:
determining the distances of said one or more objects approaching the host vehicle in a previous frame; and
setting said distance threshold as a function of a difference between said distance of the respective object approaching the host vehicle and said distance of the respective object approaching the host vehicle in a previous frame.

19. The system according to claim 15, comprising:
dynamically setting the distance threshold for each of said one or more objects approaching the host vehicle based on a velocity of the host vehicle.

20. The system according to claim 15, comprising:
dynamically setting the distance threshold for each of said one or more objects approaching the host vehicle based on a velocity of a corresponding one of the one or more objects.

21. The system according to claim 15, comprising:
dynamically setting the distance threshold for each of said one or more objects approaching the host vehicle based on a difference in velocity between the host vehicle and a corresponding one of the one or more objects.

22. A vehicle, comprising an overtaking vehicle detection system, comprising:
a camera mounted on a host vehicle at a given height and configured to a sequence of images, said camera having a given focal length; and
a processing system comprising:
  a data processor configured to:
    process said sequence of images in order to generate optical flow data comprising a list of motion vectors being associated with respective features in said sequence of images;
    analyze said optical flow data in order to group said motion vectors based on their orientation, thereby determining:
      a) a first set of optical flow data comprising the motion vectors relating to features departing from the host vehicle; and
      b) a second set of optical flow data comprising the motion vectors relating to features approaching the host vehicle;
    compute a vanishing point as a function of the motion vectors in said first set of optical flow data;
    determine a center position of said images;
    compute pan and tilt information as a function of the distance of said vanishing point from said center position of said images;
    determine one or more objects approaching the host vehicle by grouping the motion vectors in said second set of optical flow data as a function of at least two of their position, their length and their orientation, thereby identifying overtaking vehicles;

determine distances from the host vehicle of said one or more objects approaching the host vehicle as a function of:
  i) the position of the respective object in the last image of said sequence of images;
  ii) said given focal length; and
  iii) said given height;
wherein said distances are determined using the equation:

$$d = \frac{f \cdot h}{P_y}$$

where $P_y$ corresponds to the distance of a lower border of the respective cluster from the center position in a vertical direction, f is the focal length and h is the given height;

correct said determined distances from the host vehicle of said one or more objects approaching the host vehicle based on said pan and tilt information;
wherein said determined distances are corrected using the equations:

$$d_\psi = \frac{d}{\cos\psi} \text{ and}$$

$$d_{cor} = \frac{d_\psi}{\cos\varphi}$$

where $\psi$ is the pan information and $\varphi$ is the tilt information;
compare the corrected determined distances $d_{cor}$ to a distance threshold; and
determine a warning signal if the corrected determined distances are less than the distance threshold; and
an output configured to issue the warning signal; and
an alert system configured to issue an alert to a driver of the host vehicle in response to the warning signal.

23. The vehicle according to claim 22, wherein said pan ($\psi$) and tilt ($\varphi$) information are computed with the following equations:

$$\varphi = \tan^{-1}\left(\frac{VP_y}{f}\right)$$

$$\psi = \tan^{-1}\left(\frac{VP_x \cdot \cos(\varphi)}{f}\right)$$

where $VP_y$ and $VP_x$ correspond to the distance of said vanishing point with respect to said center position in a vertical and horizontal direction, respectively.

24. The vehicle according to claim 22, wherein determining one or more objects approaching the host vehicle comprises clustering the motion vectors in said second set of optical flow data with similar positions and at least one of similar lengths and similar orientations.

25. The vehicle according to claim 22, comprising:
determining the distances of said one or more objects approaching the host vehicle in a previous frame; and
setting said distance threshold as a function of a difference between said distance of the respective object approaching the host vehicle and said distance of the respective object approaching the host vehicle in a previous frame.

26. The vehicle according to claim 22, comprising:
dynamically setting the distance threshold for each of said one or more objects approaching the host vehicle based on a velocity of the host vehicle.

27. The vehicle according to claim 22, comprising:
dynamically setting the distance threshold for each of said one or more objects approaching the host vehicle based on a velocity of a corresponding one of the one or more objects.

28. The vehicle according to claim 22, comprising:
dynamically setting the distance threshold for each of said one or more objects approaching the host vehicle based on a difference in velocity between the host vehicle and a corresponding one of the one or more objects.

* * * * *